United States Patent [19]

Sato et al.

[11] 4,399,115
[45] Aug. 16, 1983

[54] SYNTHESIS OF SILICON NITRIDE

[75] Inventors: Kimihiko Sato, Yokohama; Kunihiko Terase, Tokyo; Hitoshi Kijimuta, Ebina, all of Japan

[73] Assignee: Asahi Glass Company Ltd., Tokyo, Japan

[21] Appl. No.: 362,591

[22] Filed: Mar. 29, 1982

[30] Foreign Application Priority Data

Apr. 21, 1981 [JP] Japan ................................ 56-59164

[51] Int. Cl.$^3$ ........................................ C01B 21/068
[52] U.S. Cl. ................................ 423/344; 423/406; 501/97
[58] Field of Search ................ 423/344, 487, 406; 501/97

[56] References Cited

U.S. PATENT DOCUMENTS

| | | | |
|---|---|---|---|
| 3,352,637 | 11/1967 | Heymer et al. | 423/344 X |
| 3,726,643 | 4/1973 | Merzhanov et al. | 423/344 X |
| 4,145,224 | 3/1979 | Mehalchick et al. | 423/344 X |
| 4,289,801 | 9/1981 | Galasso et al. | 423/344 X |
| 4,346,068 | 8/1982 | Kasai et al. | 423/344 |

*Primary Examiner*—Jack Cooper
*Attorney, Agent, or Firm*—Oblon, Fisher, Spivak, McClelland & Maier

[57] ABSTRACT

A process for synthesizing silicon nitride by reacting a silicon halide and ammonia at a high temperature, which is characterized in that at least while the reaction product is amorphous, hydrogen and chlorine are burned in the reaction zone where a halogen containing inorganic silicon compound and ammonia are reacting, and the reaction of said reactants is effected by the heat of combustion thus obtained.

5 Claims, No Drawings

SYNTHESIS OF SILICON NITRIDE

BACKGROUND OF THE INVENTION

1. Field of the Invention

The present invention relates to a process for synthesizing silicon nitride, and more particularly to a process for obtaining a silicon nitride powder in a high yield by the gas-phase process.

2. Description of the Prior Art

As a means for obtaining a silicon nitride powder by the gas-phase process, there has been generally employed a process which comprises reacting a silicon halide, such as silicon tetrachloride etc., with ammonia at a high temperature.

Since this process is an endothermic reaction, it has heretofore been required to impart the necessary heat of reaction to a reaction zone, such as a reactor etc., by external heating.

However, when such a process is employed, a silicon nitride synthesized on the inner wall of the reactor sticks thereto as an extremely hard deposit, which is not easily removed by scraping, and therefore, it not only causes a reduction in yield but also results in the deterioration of the reactor. Further, depending on the material used as the reactor, there are such disadvantages that on scraping the stuck silicon nitride, the material of the reaction zone is scraped away and incorporated as undesired impurities in the reaction product, and so forth.

Under such circumstances, we have been intensively studying on a means for reducing as much silicon nitride stuck within the reaction zone as possible for the purpose of improving the yield of silicon nitride obtained, and, as a result, have discovered that the sticking phenomenon of silicon nitride takes place in the stage where the reaction product from the starting materials is amorphous. It has now also been discovered that when producing silicon nitride by reacting a silicon halide with ammonia at a high temperature, such a sticking phenomenon can be effectively reduced by utilizing the heat generated by burning certain elements in the reactor to supply the heat of reaction.

SUMMARY OF THE INVENTION

Accordingly, the present invention provides a process for synthesizing silicon nitride which comprises reacting a silicon halide with ammonia at a high temperature to synthesize silicon nitride, which is characterized in that at least while the reaction product is amorphous, hydrogen and chlorine are burned in a reaction zone where a halogen containing inorganic silicon compound and ammonia are reacting and the reaction of said reactants is effected by the heat of combustion thus obtained.

DETAILED DESCRIPTION OF THE PREFERRED EMBODIMENTS

In the present invention, at least while the reaction product is amorphous, the heat of combustion of hydrogen and chlorine is employed as the heat of reaction, and furthermore, said heat of combustion is imparted by directly burning them in the reaction zone where the starting materials for the synthesis of silicon nitride are directly reacted.

According to our finding, when hydrogen and chlorine are burned alone, the range of explosion extends over a wide range of molar ratios, and in order to prevent an explosion, the heat amount which can be obtained is at most about half that of the heat of reaction required in the present invention.

However, it has been discovered as the result of our study that if the starting materials for the synthesis of silicon nitride, i.e. the halogen containing inorganic silicon compound and ammonia, are co-present in hydrogen and chlorine to be burned, the afore-described range of explosion is greatly reduced, and accordingly, the heat of reaction necessary for obtaining α-crystalline silicon nitride useful as a sintering material can also be provided. Furthermore, it has also been discovered that the silicon nitride thus synthesized, even if deposited on the inner wall of the reactor, can be scraped off much more easily beyond comparison than the case where it has been synthesized by external heating, and therefore that there is no risk of the scrape-off of the inner wall of the reactor and the incorporation of impurities resulting therefrom, and also that the percent recovery can be enhanced.

It is no exaggeration to say that the above finding is a surprising and unexpected effect, which has never been anticipated.

The hydrogen and chlorine are introduced into a zone where the starting materials for the synthesis of silicon nitride, i.e. the halogen containing inorganic silicon compound and ammonia, are actually reacted. While there is no particular restriction on the specific means of introduction, there may be appropriately employed, for example, a method comprising mixing the halogen containing inorganic silicon compound with chlorine, and ammonia with hyrogen and introducing the mixtures into a reaction zone using a double-tube nozzle, a method comprising introducing chlorine and hydrogen into a reaction zone of the starting materials for the synthesis, both as a mixture but separately from the starting materials using a double-tube nozzle, and the like.

Preferred as the halogen containing inorganic silicon compound used in the present invention are chlorides of silicon such as $SiCl_4$, $SiHCl_3$, $SiH_2Cl_2$, $SiH_3Cl$ etc, among which $SiCl_4$ and $SiHCl_3$ are particularly preferred because of their reactivity, easiness of handling, etc. Further, according to the necessity, other silicon halides such as $SiBr_4$, $SiHBr_3$, $SiH_2Br_2$, $SiH_3Br$, $SiI_4$, $SiHI_3$, $SiH_2I_2$, $SiH_3I$, $SiCl_2Br_2$, $SiCl_2I_2$ etc. may also be employed. Some of those are gaseous at normal temperature, and the others are liquid or solid. In the latter case, in order to efficiently carry out a uniform reaction, it is preferred to gasify them before use in the reaction, by means of e.g. suitable indirect heating, etc.

While the reaction of these starting materials can be effected in one stage, it is preferred to carry it out in two stages, since the retention of the halogen in the resulting silicon nitride can be substantially avoided.

When the reaction is carried out in one stage, the molar ratio of ammonia to the afore-mentioned silicon compound is adjusted to 0.1–5, the molar ratios of hydrogen and chlorine to the fore-mentioned silicon compound to 0.7–15.1 and 0.6–13.1 respectively, and they are burned in the starting material reaction zone, thereby effecting the reaction for a reaction time of 30–0.1 seconds.

On the other hand, when the reaction is carried out in two stages, it is possible to terminate the reaction in the first stage when an amorphous reaction product has been produced and to effect the formation of the α-crystalline silicon nitride in the second stage.

In this case, the first-stage reaction may be carried out according to the present invention. In other words, the molar ratio of ammonia to the halogen containing inorganic silicon compound is adjusted to 0.1–3, the molar ratios of hydrogen and chlorine to the afore-mentioned silicon compound to 0.4–8.5 and 0.3–7.4 respectively, and they are burned in the reaction zone, thereby effecting the reaction for a reaction time of 30–0.1 seconds. Thereafter, as the second-stage reaction, the system is maintained in a nitrogen and/or ammonia stream at 600°–1700° C. for 8–0.2 hours, thereby silicon nitride substantially free from halogen can be obtained. The second-stage reaction may be either by burning of hydrogen and chlorine in the reaction system, or by the conventional external heating method.

Further, the relationship between the reaction and the temperature is such that within each afore-mentioned range, the higher the reaction temperature reaches, the shorter the reaction time becomes.

One preferred example of specific means for actually practicing the process of the present invention is as follows: First, the reactor is heated to above the combustion temperature of hydrogen and chlorine using an auxiliary heater while introducing a nitrogen gas into a tube reactor equipped with such an auxiliary heater. Thereafter, hydrogen and chlorine are introduced and ignited to burn, and at the same time, the auxiliary heater is switched off, the starting materials, i.e. a gaseous halogen containing inorganic silicon compound and an ammonia gas are introduced, mixed and reacted in the reactor. The product is separated and collected from the gas which contains the reaction product thus formed under oxygen-free conditions. Subsequently, also under oxygen-free conditions, the product is maintained in a nitrogen and/or ammonia stream at 600°–1700° C. for 8–0.2 hours.

The present invention is more particularly described by the following examples.

EXAMPLE 1

An apparatus comprising a tube reactor composed of a mullite tube of 10 cm in inner diameter and 1.5 m in height and having an external heating auxiliary heater and a reaction product collector provided under the reactor was employed. The reactor was heated to 800° C. by the auxiliary heater while introducing a nitrogen gas into the reactor, then by a double-tube nozzle, chlorine and hydrogen were introduced via the inner tube and the outer tube respectively, ignited and burned in the reactor. At the same time, the electricity source for the auxiliary heater was switched off, and a reaction gas (NH$_3$/SiCl$_4$=1.2 by molar ratio) was supplied through the double-tube nozzle at 9.1 g/min of SiCl$_4$ through the inner tube (chlorine side) and at 1.44 Nl/min of NH$_3$ through the outer tube (hydrogen side), and the reaction was effected at 1000° C. for 10 hours. The amounts of hydrogen and chlorine supplied on the reaction were 4.0 Nl/min and 3.5 Nl/min, respectively.

The results of the production of the reaction product were as follows:

| | |
|---|---|
| Powder product collected by the collector: | 70 wt. % |
| Powder product deposited on the reactor wall: | 20 wt. % |
| Product stuck on the reactor wall (easily removed by scraping): | 10 wt. % |

The thus obtained powder product was transferred to a graphite container under nitrogen atmosphere, and heat treated at 1550° C. in a reaction furnace (electric furnace) of the external heating mode under nitrogen atmosphere for 2 hours.

Assay of the obtained silicon nitride powder revealed 0.1% of chlorine and 39.3% of nitrogen.

EXAMPLE 2

Using the same apparatus as in Example 1, procedures similar to those in Example 1 were conducted; that is, chlorine and hydrogen were ignited and burned, and at the same time, the electricity source for the auxiliary heater was switched off, a reaction gas (NH$_3$/SiCl$_4$=2 by molar ratio) was supplied through the double-tube nozzle at 9.1 g/min of SiCl$_4$ through the inner tube (chlorine side) and at 2.4 Nl/min of NH$_3$ through the outer tube (hydrogen side), and the reaction was effected at 1200° C. for 10 hours. The amounts of hydrogen and chlorine supplied on the reaction were 6.3 Nl/min and 5.5 Nl/min, respectively.

The results of the production of the reaction product were as follows:

| | |
|---|---|
| Powder product collected by the collector: | 68 wt. % |
| Powder product deposited on the reactor wall: | 20 wt. % |
| Product stuck on the reactor wall (easily removed by scraping): | 12 wt. % |

The thus obtained powder product was transferred to a graphite container under nitrogen atmosphere, and heat treated at 1550° C. using the same electric furnace as in Example 1 under nitrogen atmosphere for 2 hours.

Assay of the obtained silicon nitride powder revealed 0.09% of chlorine and 39.4% of nitrogen.

EXAMPLE 3

An apparatus comprising a tube reactor composed of a graphite reactor of 10 cm in inner diameter and 1.5 m in height and having an external heating auxiliary heater, and a reaction product collector provided under the reactor was employed. The reactor was heated to 800° C. by the auxiliary heater while introducing a nitrogen gas into the reactor, then by a double-tube nozzle, chlorine and hydrogen were introduced via the inner tube and the outer tube respectively, ignited and burned in the reactor. At the same time, the electricity source for the auxiliary heater was switched off, and a reaction gas (NH$_3$/SiCl$_4$=3 by molar ratio) was supplied through the double-tube nozzle at 9.1 g/min of SiCl$_4$ through the inner tube (chlorine side) and at 3.6 Nl/min of NH$_3$ through the outer tube (hydrogen side), and the reaction was effected at 1600° C. for 8 hours. The amounts of hydrogen and chlorine supplied on the reaction were 12.1 Nl/min and 10.5 Nl/min, respectively.

The results of the production of the reaction product were as follows:

| | |
|---|---|
| Powder product collected by the collector: | 65 wt. % |
| Powder product deposited on the reactor wall: | 15 wt. % |

| Product stuck on the reactor wall (easily removed by scraping): | 20 wt. % |
|---|---|

The thus obtained powder product was transferred to a graphite container under nitrogen atmosphere, and heat treated at 700° C. in an electric furnace under nitrogen atmosphere for 2 hours, to remove NH₄Cl.

Assay of the obtained silicon nitride powder revealed 1.2% of chlorine and 38.0% of nitrogen.

EXAMPLE 4

Using the same apparatus as in Example 1, procedures similar to those in Example 1 were conducted; that is, chlorine and hydrogen were ignited and burned, and at the same time, the electricity source for the auxiliary heater was switched off, a reaction gas (NH$_3$/SiHCl$_3$=1.2 by molar ratio) was supplied through the double-tube nozzle at 7.3 g/min of SiHCl$_3$ through the inner tube (chlorine side) and at 1.44 Nl/min of NH$_3$ through the outer tube (hydrogen side), and the reaction was effected at 900° C. for 10 hours. The amounts of hydrogen and chlorine supplied on the reaction were 2.3 Nl/min and 2.0 Nl/min, respectively.

The results of the production of the reaction product were as follows:

| Powder product collected by the collector: | 71 wt. % |
|---|---|
| Powder product deposited on the reactor wall: | 15 wt. % |
| Product stuck on the reactor wall (easily removed by scraping): | 14 wt. % |

The thus obtained powder product was transferred to a graphite container under nitrogen atmosphere, and heat treated at 1500° C. using the same electric furance as in Example 2 under nitrogen atmosphere for 2 hours.

Assay of the obtained silicon nitride powder revealed 0.08% of chlorine and 39.3% of nitrogen.

COMPARATIVE EXAMPLE

Using the same apparatus as in Example 1, and while heating by the external heating auxiliary heater, a reaction gas (NH$_3$/SiCl$_4$=1.2 by molar ratio) was supplied through the double-tube nozzle at 9.1 g/min of SiCl$_4$ through the inner tube and at 1.44 Nl/min of NH$_3$ through the outer tube, and the reaction was effected at 1000° C. for 10 hours.

The results of the production of the reaction product were as follows:

| Powder product collected by the collector: | 35 wt. % |
|---|---|
| Powder product deposited on the reactor wall: | 15 wt. % |
| Product stuck as hard scalling on the reactor wall (difficult removed): | 50 wt. % |

The thus obtained powder product was transferred to a graphite container under nitrogen atmosphere, and heat treated at 1550° C. using the same electric furnace as in Example 1 under nitrogen atmosphere for 2 hours.

Assay of the obtained silicon nitride powder revealed 0.11% of chlorine and 39.3% of nitrogen.

We claim:

1. A process for producing α-silicon nitride comprising:
    reacting a silicon halide and ammonia to form silicon nitride, wherein, at least while the reaction product of said silicon halide and said ammonia is amorphous, supplying the heat necessary to sustain the reaction by burning hydrogen and chlorine in the presence of said silicon halide and said ammonia, whereby the reaction is effected by the heat of combustion of said hydrogen and chlorine.

2. The process according to claim 1, wherein the molar ratio of ammonia to the silicon halide is from 0.1 to 5, the molar ratio of hydrogen to the silicon halide is from 0.7 to 15.1, the molar ratio of chlorine to the silicon halide is from 0.6 to 13.1 and the reaction is effected for a reaction time of from 0.1 to 30 seconds.

3. The process according to claim 1, wherein the molar ratio of ammonia to the silicon halide is from 0.1 to 3, the molar ratio of hydrogen to the silicon halide is from 0.4 to 8.5, the molar ratio of chlorine to the silicon halide is from 0.3 to 7.4 and the reaction is effected for a reaction time of from 0.1 to 30 seconds, and thereafter the reaction product is held at a temperature of from 600°–1700° C. for 0.2–8 hours under a nitrogen and/or ammonia atmosphere.

4. The process according to claim 2 or 3 wherein the silicon halide is a chloride of silicon.

5. The process according to claim 4, wherein the chloride of silicon is SiCl$_4$ or SiHCl$_3$.

* * * * *